United States Patent [19]
Llorens et al.

[11] Patent Number: 5,748,924
[45] Date of Patent: May 5, 1998

[54] METHOD AND APPARATUS FOR TRANSFERRING DATA FROM SCSI BUS TO SERIAL DEVICE AND FROM SERIAL DEVICE TO SCSI BUS

[75] Inventors: Joseph R. Llorens, Winfield; Huili Wang, Round Lake Beach, both of Ill.

[73] Assignee: Methode Electronics, Inc., Chicago, Ill.

[21] Appl. No.: 544,275

[22] Filed: Oct. 17, 1995

[51] Int. Cl.[6] .............................. G06F 11/00; G06F 13/00
[52] U.S. Cl. .................. 395/309; 395/891; 395/200.21; 395/200.01; 395/892; 395/885; 341/100; 341/101
[58] Field of Search .......................... 395/891, 309, 395/200.21, 200.01, 892, 885; 341/100, 101

[56] References Cited

U.S. PATENT DOCUMENTS

| | | |
|---|---|---|
| 4,388,683 | 6/1983 | Beifuss et al. |
| 5,086,388 | 2/1992 | Matoba et al. |
| 5,361,346 | 11/1994 | Panesar et al. |
| 5,537,626 | 7/1996 | Kraslavsky et al. |

OTHER PUBLICATIONS

Davidson, System for Accessing Shared Resource Device by Intelligent User Devices, U.S. Statutory Invention Registration, Oct. 3, 1989.
NCR; "NCR SCSI Products: NCR 53C90A, 53C90B—Advanced SCSI Controller"; 1990; pp. 1–48.
Philips; "Philips Semiconductors—Product specification: CMOS single–chip 8–bit microcontroller—80C31/80C51/87C51"; Aug. 5, 1994; pp. 141–158.

Primary Examiner—Jack B. Harvey
Assistant Examiner—Rupal D. Dharia
Attorney, Agent, or Firm—Jeffrey H. Canfield; David L. Newman

[57] ABSTRACT

An adapter for performing bi-directional data transfers between a SCSI bus, which transfers data using a parallel format, and a serial transfer medium, which transfers data using a serial format and being connected to a serial device. The adapter bi-directionally transfers SCSI data between itself and the SCSI bus. In addition, the adapter bi-directionally converts between SCSI formatted data and serially formatted data. Furthermore, the adapter bi-directionally transfers serially formatted data between itself and the serial transfer medium.

16 Claims, 4 Drawing Sheets

5,748,924

METHOD AND APPARATUS FOR TRANSFERRING DATA FROM SCSI BUS TO SERIAL DEVICE AND FROM SERIAL DEVICE TO SCSI BUS

BACKGROUND OF THE INVENTION

This invention relates generally to adapters and in particular, it relates to an adapter and method for transferring data from a Small Computer Systems Interface (SCSI) data bus, via a serial data transmission medium, to a serial device, wherein the data transfer signal definition used for transmitting data over the serial transmission medium is defined by the requirements of the serial device.

In general terms, SCSI is defined as a data transfer protocol which provides for an efficient peer-to-peer I/O bus. The data transfer protocol defined by SCSI is primarily used by data buses which operate at high speeds such as 10 MB/S, synchronously, or 5 MB/S, asynchronously. Currently, the second revision of SCSI is specified by ANSI standard, X3.131-1994. However, in the context of the present invention, the term "SCSI" is meant to include all prior and future revisions of the ANSI standard.

Currently, there are no adapters which allow a SCSI bus to communicate over a serial transfer medium. However, there are many devices which exclusively use a serial transmission medium as a means of communicating. For example, there are a variety of modems which only use a serial transmission medium as a means of communicating with other devices. Furthermore, most modems transfer data over the serial transmission medium by using the data transfer signal definition defined by EIA standard RS-232.

Therefore, there is a need for an adapter which transfers data from a SCSI data bus, via a serial data transmission line, to a serial device. In addition, there is a need for an adapter which transfers data from a SCSI data bus, via a serial data transmission medium, to a serial device, by using the data transfer signal definition as required by the serial device. The present invention is such an apparatus.

In view of the above, it is an object of the present invention to provide an adapter for transferring data from a SCSI data bus, via a serial data transmission medium, to a serial device.

It is another object of the present invention to use the data transfer signal definition which is required by the serial device.

Also, it is another object of the present invention to provide a computer, having a SCSI bus, with a means to send and receive data to and from a serial device, such as a modem, by using the SCSI bus.

It is yet another object of the present invention to allow for a delay in the data transfer rate between a SCSI data bus and a different type of transfer medium such as a plurality of serial transmission wires.

Furthermore, other objects, features, and advantages of the present invention will be apparent from the following detailed description taken in connection with the accompanying drawings.

SUMMARY OF THE INVENTION

In one form of the invention, an adapter is provided for performing bi-directional data transfers between a SCSI bus, which transfers data using a parallel format, and a serial transfer medium, which transfers data using a serial format and being connected to a serial device. The adapter bi-directionally transfers SCSI data between itself and the SCSI bus. In addition, the adapter bi-directionally converts between SCSI formatted data and serially formatted data. Furthermore, the adapter bi-directionally transfers serially formatted data between itself and the serial transfer medium.

In an embodiment, the present invention further provides for the storing of SCSI data and program data. Moreover, the serial transfer medium may consist of, for example, a transmission line, an optical fiber, or a wireless means such as RF or infrared. Likewise, the serial data transfers may conform to standards such as RS-232, RS-488, or Fiber Channel.

In yet another form of the invention, a method of transferring data between a SCSI bus and a serial device is provided. The method consists of: 1) receiving parallel formatted data from said SCSI bus; 2) converting said parallel formatted data into serially formatted data; and 3) transmitting said serially formatted data to said serial device.

In an embodiment, the above method further provides for storing the parallel formatted data into a FIFO memory and reading the data stored within the FIFO memory.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a presently preferred embodiment of the present invention, wherein like numerals in the various figures pertain to like elements, and wherein.

DETAILED DESCRIPTION OF THE PRESENTLY PREFERRED EMBODIMENTS

Figure 1:
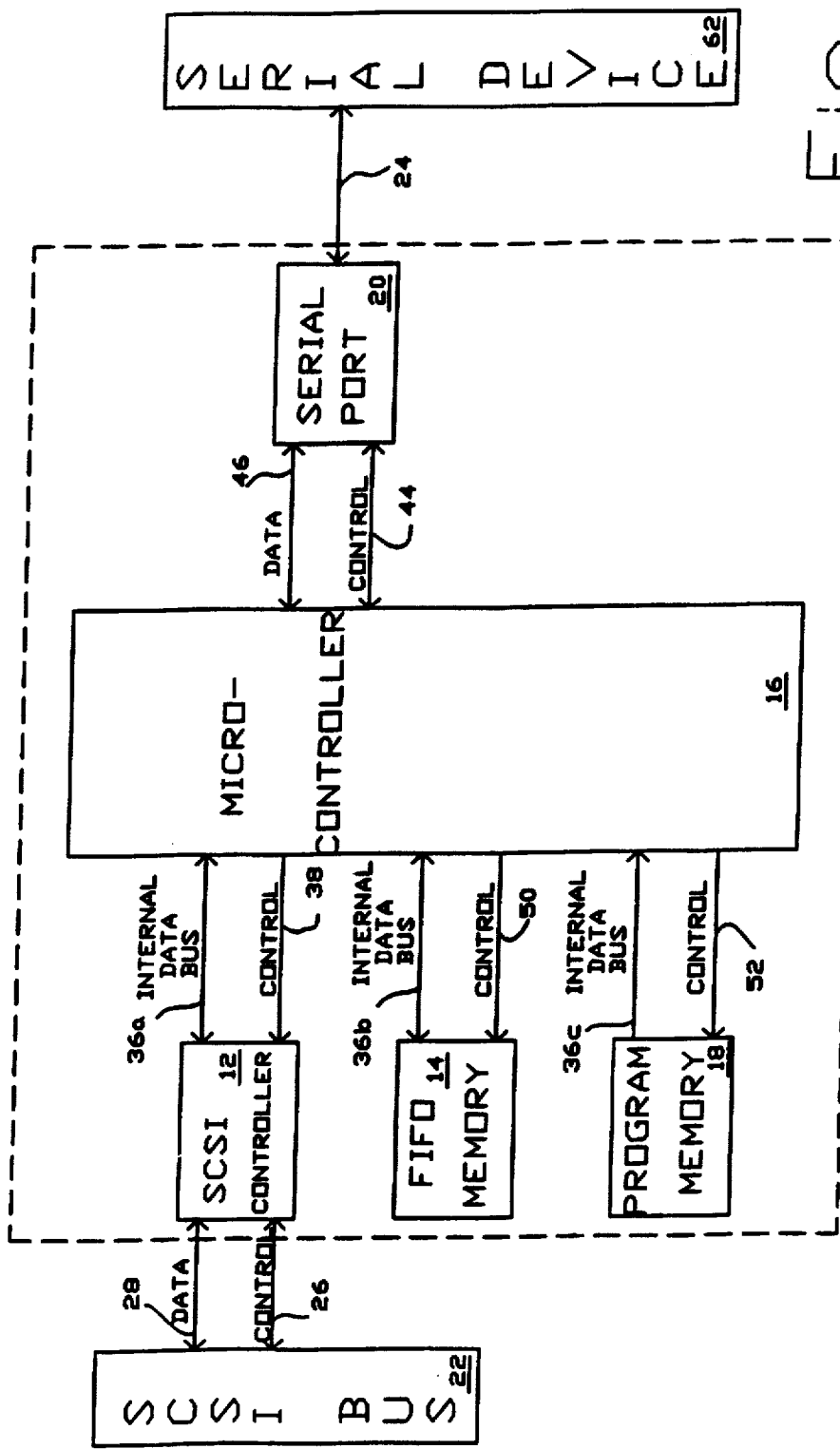
FIG. 1 illustrates a block diagram of an embodiment of an adapter in accordance with the present invention.

Referring to the drawings, and particularly to FIG. 1, a functional block diagram of an adapter 10 in accordance with the present invention is illustrated. In the presently preferred embodiment, the adapter 10 consists of a SCSI controller 12, a FIFO memory 14, a microcontroller 16, a program memory 18, and a serial port 20. In FIG. 1, a single block may indicate several individual circuits which collectively perform a single function. Likewise, a single line within FIG. 1 may indicated several individual signal lines for performing a particular operation. Consequently, it should be clear to one of ordinary skill in the art, after perusal of the specification, drawings and claims herein, how to make and use the invention.

In FIG. 1, the adapter 10 receives and transmits data between a SCSI bus 22 and a serial data transfer medium 24 consisting of, for example, a plurality of serial data transmission lines. Preferably, a data transmission over the serial data transfer medium 24 conforms to the requirements of EIA standard RS-232, Revision C. However, it should be understood that the present invention is applicable to adapters which support other types of serial data transmission standards such as, for example, RS-488 or the Fiber Channel standard as currently defined by ANSI X3T11.

In FIG. 1, the SCSI controller 12 is connected to the SCSI bus 22 and the microcontroller 16. The plurality of connections between the SCSI controller 12 and the SCSI bus 22 provide for the bi-directional transfer of data between the adapter 10 and the SCSI bus. As commonly known in the art, the SCSI bus 22 consists of nine (9) SCSI bus control signal lines 26 and nine (9) SCSI bus data lines 28 with one (1) of the data lines consisting of a data parity line. Accordingly, both the SCSI bus control lines 26 and the SCSI bus data lines 28 are connected directly from the SCSI bus to the SCSI controller 12.

Figure 2:
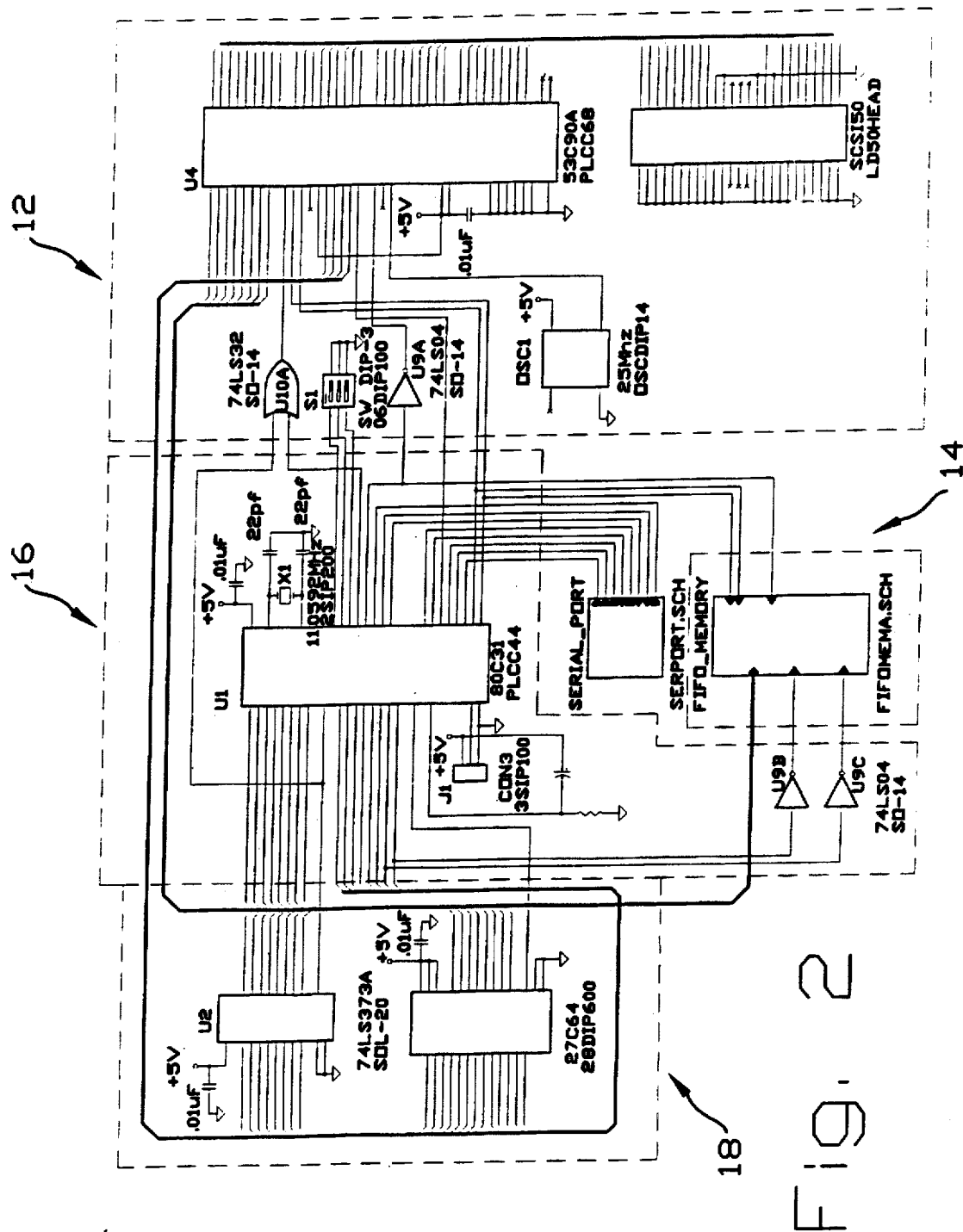
FIG. 2 illustrates a circuit diagram of the adapter depicted in FIG. 1, wherein only the serial port and the FIFO memory remain depicted as functional blocks.

The bi-directional transfer of data between the adapter 10 and the SCSI bus 22 is performed by the SCSI controller 12 in accordance with the requirements of the SCSI standard (ANSI X3.131-1994). Accordingly, the SCSI controller 12 is designed to provide, and receive, all SCSI bus signals which are needed for providing such operations. As shown in FIG. 2, the SCSI controller 12 depicted in FIG. 1 preferably consists of, inter alia, a 25 Mhz oscillator 30, a 53C90 SCSI controller 32 which is manufactured by NCR, and a SCSI connector 34 for mating with the SCSI bus.

As indicated above, besides interfacing with the SCSI bus 22, the SCSI controller 12 also interacts with an internal bus as depicted by 36a–c in FIG. 1. Although the internal bus is depicted by 36a–c in FIG. 1, it should be understood that only one internal bus may be used as shown by the internal bus 36 depicted in FIG. 2. Referring back to FIG. 1, the internal bus 36a is used as a means for transferring data between the SCSI controller 12 and the microcontroller 16. The transfer of data along the internal bus 36a is controlled by a group of internal control signals which are transmitted over a plurality of control signal lines 38. Accordingly, the internal control signals provide, inter alia, information regarding the status of the data to be transmitted between the SCSI bus 22 and the serial transfer medium 24. In addition, the internal control signals provide information regarding the availability of the SCSI bus 22 and the internal status of the SCSI controller 12 and the microcontroller 16.

Turning to the microcontroller 16, besides being connected to the SCSI controller 12, the microcontroller is also connected to the FIFO memory 14, the serial port 20, and the program memory 18. The FIFO memory 14 provides for the temporary storage of data. The connections for transferring data between the FIFO memory 14 and the microcontroller 16 are depicted by the internal bus 36b. Furthermore, the signals to control the reading and writing of data by the FIFO memory 14 are transmitted, via the internal control signal lines 50, by the microcontroller 16. Therefore, the microcontroller 16 can command the FIFO memory 14 to transmit stored data onto the internal bus 36b and/or write data which is being transmitted on the internal bus.

As a result of the microcontroller 16 being connected to the FIFO memory 14 as described above, the adapter 10 can instantly upload a packet of data from the SCSI bus, via the SCSI controller 12 and the microcontroller 16, and store the data within the FIFO memory 14. After the data is stored, the microcontroller 16 can command the FIFO memory 14 to read the data back. During the read-back, the data can be transmitted, at a different clock rate, to the serial port 20 as describe further herein.

Likewise, the microcontroller 16 can directly download data into the FIFO memory 14 which has been transmitted to the microcontroller by the serial port 20 as described further herein. The packet of data which has been stored within the FIFO memory 14 can be read by the microcontroller 16 and transmitted instantly, via the SCSI controller 12, onto the SCSI bus 22.

Although a FIFO memory has been used in the preferred embodiment, it should be understood that other types of memory could be utilized in implementing the invention.

Figure 3:
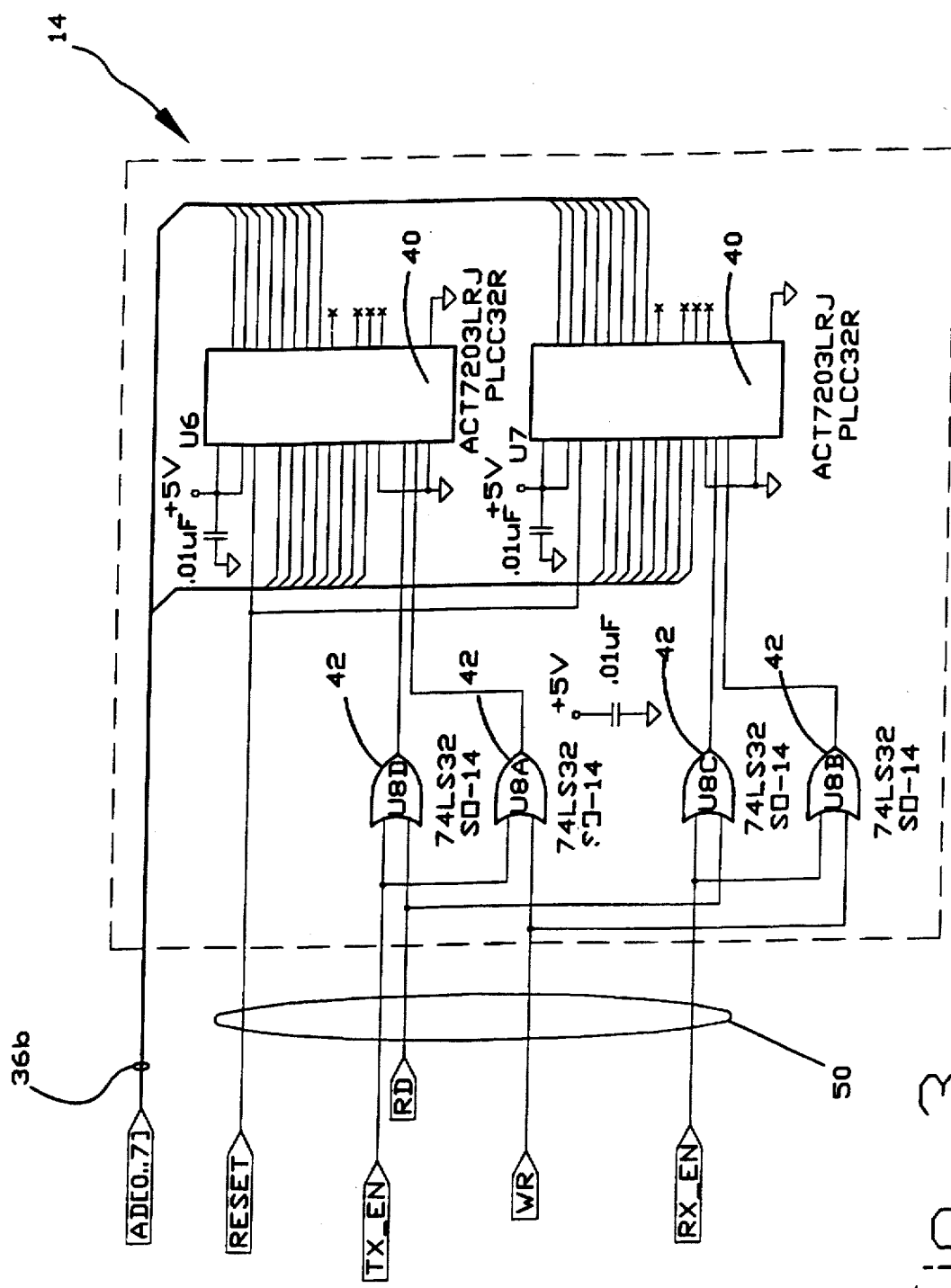
FIG. 3 illustrates a circuit diagram of the serial port functional block depicted in FIG. 2.

During the transmission of data between the FIFO 14, microcontroller 16, and the SCSI controller 12 the data being transferred is contained within a parallel format. In the preferred embodiment, the parallel format consists of an eight (8) bit data word. Correspondingly, the parallel formatted data can be bi-directionally transmitted between the SCSI bus 22 and the internal bus 36 without the need for conversion into a different format since both the SCSI bus and the internal bus use an eight bit data word. Thus, it is preferred that the FIFO memory 14 stores data consisting of a plurality of eight bit words. As shown in FIG. 3, the FIFO memory 14 depicted in FIG. 1 consists of, inter alia, two (2) ACT7203LRJ FIFOs 40 along with support circuitry consisting of four OR-gates 42.

Moving back to FIG. 1, the interconnections between the microcontroller 16 and the serial port 20 provide for the bi-directional transfer of serially formatted data between the microcontroller and the serial port. Accordingly, the microcontroller 16 provides, and receives, signals from the serial port 20 for bi-directionally transferring serially formatted data. Thus, serial control signals are transmitted between the serial port and the microcontroller via a plurality of serial control lines 44. Likewise, data signals are transmitted between the serial port and the microcontroller via a plurality of serial data lines 46.

As stated previously, all data transfers on the internal bus 36 are conducted using a parallel format. Conversely, all data transfers on the serial data lines 46 use a serial format. Thus, the microcontroller 16 has an internal Universal Asynchronous Receiver Transmitter (UART) for performing serial and parallel data conversions between the internal bus 36 and the serial data lines 46. As shown in FIG. 2, the microcontroller may consists of, inter alia, a 80C31 microcontroller 48, by Phillips Semiconductors, along with support circuitry.

Besides performing serial and parallel data conversions between the internal bus 36 and the serial data lines 46, it is also preferred that the microcontroller 16 also initialize all circuitry, check all diagnostics, regulate timing, and maintain the interface between the FIFO memory 14, the internal bus, and the SCSI controller 12. The instructions for performing these various functions are programmed within the microcontroller 16 by the program memory 18. Correspondingly, the program data is transmitted from the program memory 18, to the microcontroller 16, via the internal data bus as depicted by 36c in FIG. 1. Likewise, the signals to maintain the interface between the program memory 18 and the microcontroller 16 are transmitted over a plurality of control signal lines 52. As shown in FIG. 2, the program memory 18 consists of a 27C64 EPROM 54, a 74LS373A latch 56, and various support circuitry. The latch 56 is used to set part of the EPROM address during the loading of the program data from the EPROM 54 to the microcontroller 16.

Figure 4:
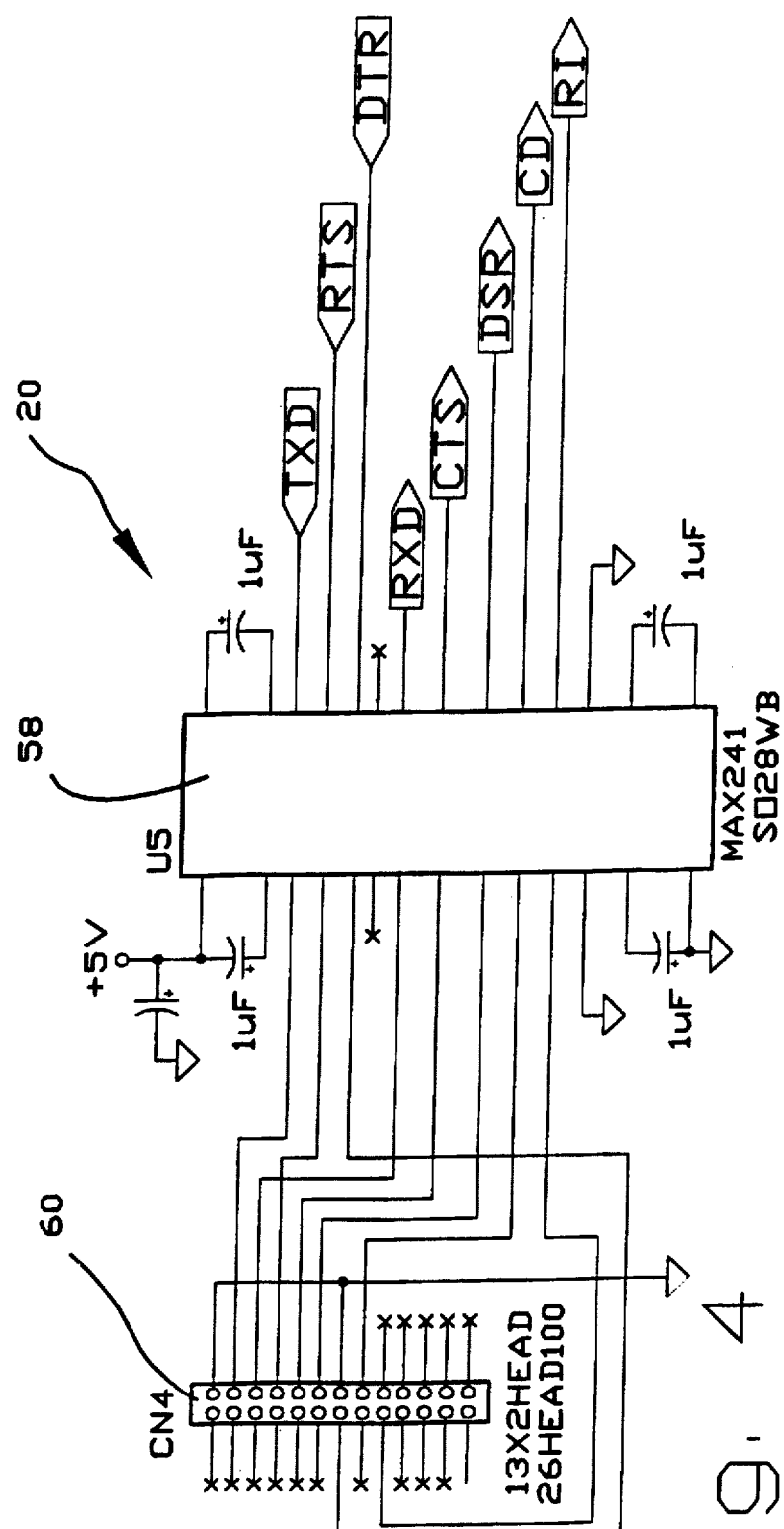
FIG. 4 illustrates a circuit diagram of the FIFO memory functional block depicted in FIG. 2.

As discussed previously, the microcontroller 16 is connected to the serial port 20 such that the serial control and data signals 44,46 can be bi-directionally transmitted between the microcontroller 16 and the serial port 20. In the preferred embodiment, the voltage level of the control and data signals being transmitted between the microcontroller 16 and the serial port 20 remain at a standard logic level. Conversely, in the preferred embodiment, the serially formatted data is to be bi-directionally transmitted over the serial transfer medium in accordance with the signal definition as defined by EIA standard RS-232. Consequently, the serial port 20 bi-directionally converts the signals between the microcontroller 16 and the serial transfer medium 24 such that standard logic level signals are transmitted and received by the microcontroller 16 and, conversely, only signals which comply with the voltage level requirements specified by RS-232 are transmitted over the serial transfer medium 24. As shown in FIG. 4, the serial port 20 may consist of, inter alia, a 80C31 MAX241 Multi-Channel RS-232 Driver/Receiver 58 which is connected to a serial port connector 60 for mating with RS-232 transmission lines.

Turning to the operation of the adapter 10 depicted in FIG. 1, data is bi-directionally transferred from the SCSI bus 22, via the serial data transmission medium 24, to a device 62 which only receives and transmits data using the RS-232 standard, such as a modem. Thus, during a transfer of data from the SCSI bus 22 to the RS-232 device 62, data contained on the SCSI bus is received by the SCSI controller 12 and simultaneously downloaded, via the microcontroller 16, into the FIFO memory 14. Once the data is loaded into the FIFO memory 14, the data is simultaneously read by the microcontroller 16, covered into serial data, and then transmitted to the serial device 62 by the serial port 20.

Likewise, during a transfer of data from the RS-232 device 62 to the SCSI bus 22, serial data being transmitted on the serial transfer medium 24 is simultaneously received by the microcontroller 16, via the serial port 20, converted into parallel data, and then downloaded into the FIFO memory 14. Once the data is loaded into the FIFO memory 14, the data is simultaneously read by the microcontroller 16 and transmitted onto the SCSI bus 22 by the SCSI controller 12.

For completeness in the disclosure of the above-described adapter 10, but not for purpose of limitation, the above component identifications were submitted. Those components were employed in an adapter that was constructed and tested and which provides a high quality performance. Those skilled in the art will recognized that many alternative elements and values may be employed in constructing the circuity in accordance with the present invention.

Furthermore, although an adapter is depicted in the presently preferred embodiment for transmitting and receiving parallel and serially formatted data over a serial transfer medium consisting of a plurality of electrical transmission lines, it should be understood that the data can be transmitted and received by using many different types of transfer media such as a wireless transfer media or an optical fiber for using long wave laser, short wave laser, or Light Emitting Diode (LED). Accordingly, the transfer speed of the serial data will vary depending on what type of serial transfer medium is utilized.

Finally, it should be understood that various changes and modifications to the presently preferred embodiments described herein will be apparent to those skilled in the art. Such changes and modifications may be made without departing from the spirit and scope of the present invention and without diminishing its attendant advantages. Therefore, it is intended that such changes and modifications be covered by the appended claims.

We claim:

1. An adapter for performing bi-directional data transfers between a SCSI bus, and a serial transfer medium, said adapter comprising:
    a) a SCSI controller providing bi-directional parallel SCSI data transfers between said SCSI bus and said adapter according to standard SCSI protocol;
    b) a serial port providing bi-directional serial format data transfers between said adapter and said serial transfer medium;
    c) a micro-controller for converting SCSI data received by said SCSI controller to serial format data to be transferred to said serial transfer medium through said serial port, and for converting serial data received by said serial port to parallel SCSI data to be transferred to said SCSI bus through said SCSI controller; and
    d) a memory device for temporarily storing SCSI data received by said SCSI controller to be converted to serial data, and SCSI data having been converted from serial data received by said serial port to be transferred to said SCSI bus.

2. The adapter of claim 1, wherein said memory device comprises an eight bit first in first out memory device such that eight bit data words stored in said memory device will be read from said memory device in the order in which they are stored.

3. The adapter of claim 2, further comprising means for storing programmed instructions for controlling said micro-controller connected to said micro-controller.

4. The adapter of claim 3 wherein said serial transfer medium consists of a transmission line.

5. The adapter of claim 3, wherein said serial transfer medium consists of an optical fiber.

6. The adapter of claim 3, wherein said serial transfer medium consists of a wireless transfer means.

7. The adapter of claim 3 wherein said serial data conforms to the RS-232 standard.

8. The adapter of claim 3 wherein said serial data conforms to the RS-488 standard.

9. The adapter of claim 3 wherein said serial data conforms to the Fiber Channel standard.

10. An adapter for performing bi-directional data transfers between a SCSI bus and a serial device, said adapter comprising:
    a micro-controller for converting parallel format SCSI data signals to serial format data signals, and for converting serial format data signals to parallel format SCSI signals;
    a SCSI controller electrically disposed between said SCSI bus and said micro-controller, for controlling bi-directional parallel SCSI data exchange between said SCSI bus and said micro-controller;
    a serial port for controlling bi-directional serial data exchange between said serial device and said micro controller; whereby
    said micro-controller receives parallel SCSI signals from said SCSI controller, converts said SCSI signals to a serial data format, and outputs said converted serial data signals to said serial port; and
    said micro-controller receives serial format data signals from said serial port, converts said serial data signals to parallel SCSI format signals, and outputs said converted SCSI signals to said SCSI controller.

11. The adapter of claim 10, further comprising a memory device connected to said micro-controller, said micro-controller temporarily storing within said memory device both parallel data received from said SCSI controller prior to converting said parallel data to serial data, and said parallel data converted by said micro-controller from serial data received from said serial port prior to be output to said SCSI controller.

12. The adapter of claim 11 wherein said memory device consists of a FIFO memory wherein said parallel data stored in said FIFO memory is read from said FIFO memory in the same order said data was written thereto.

13. The adapter of claim 12 further comprising a program memory connected to said micro-controller.

14. The adapter of claim 13 wherein said serial device consists of a modem.

15. A method of bi-directionally transferring data between a parallel format SCSI bus and a serial device, said method comprising the steps of:

transferring data from said SCSI bus to said serial device; and transferring data from said serial device to said SCSI bus; wherein the step of transferring data from said SCSI bus to said serial device further comprises the steps of:

receiving parallel format data words from said SCSI bus;

sequentially storing the parallel data words received from said SCSI bus in a memory device in the order in which they are received;

sequentially converting the parallel data words stored in said memory device into serial format data, the parallel words being converted in the order in which they are stored in said memory device;

transmitting the serial formatted data to said serial device; and wherein the step of transferring data from said SCSI bus to said serial device further comprises the steps of:

receiving serial formatted data from said serial device;

converting the serial format data received from said serial device into parallel format data words;

sequentially storing the converted parallel format data words in said memory device;

sequentially writing the converted parallel format data words stored in said memory device to said SCSI bus in the order in which they are stored within said memory device.

16. The method of claim 15, wherein said memory device is a FIFO memory such that parallel data words read into the memory are written out of the memory in the same order as which the are written.

* * * * *